(12) United States Patent
Birdwell

(10) Patent No.: US 8,230,813 B1
(45) Date of Patent: Jul. 31, 2012

(54) METHOD AND APPARATUS FOR TRANSPORTING MIGRATORY FISH

(76) Inventor: Larry Birdwell, Vancouver, WA (US)

( * ) Notice: Subject to any disclaimer, the term of this patent is extended or adjusted under 35 U.S.C. 154(b) by 0 days.

(21) Appl. No.: 13/304,077

(22) Filed: Nov. 23, 2011

(51) Int. Cl.
*A01K 63/02* (2006.01)

(52) U.S. Cl. .................................... 119/203; 119/223

(58) Field of Classification Search ............ 119/201, 119/203, 208, 215, 223, 239, 240; 114/242, 114/244, 253
See application file for complete search history.

(56) References Cited

U.S. PATENT DOCUMENTS

| | | | | |
|---|---|---|---|---|
| 1,461,350 A | * | 7/1923 | Friedrichs | 119/203 |
| 2,854,782 A | * | 10/1958 | Daugherty | 43/55 |
| 3,509,848 A | * | 5/1970 | Salmon | 114/245 |
| 3,573,934 A | * | 4/1971 | Mitchell | 119/203 |
| 3,777,709 A | * | 12/1973 | Anderson et al. | 119/217 |
| 4,252,081 A | * | 2/1981 | Smith | 119/223 |
| 4,351,268 A | * | 9/1982 | Blair et al. | 119/223 |
| 4,509,458 A | * | 4/1985 | Rines et al. | 119/217 |
| 4,756,671 A | * | 7/1988 | Grimes et al. | 417/53 |
| 4,768,920 A | * | 9/1988 | Gurth | 415/90 |
| 4,876,985 A | * | 10/1989 | Marcum et al. | 119/240 |
| 5,078,579 A | * | 1/1992 | Ryan | 417/126 |
| 5,967,086 A | * | 10/1999 | Knott, Sr. | 119/223 |
| 6,481,378 B1 | * | 11/2002 | Zemach | 119/223 |
| 6,883,265 B1 | * | 4/2005 | Jenssen | 43/9.1 |
| 7,661,389 B2 | * | 2/2010 | Tuerk | 119/223 |

* cited by examiner

*Primary Examiner* — Rob Swiatek
*Assistant Examiner* — Ebony Evans
(74) *Attorney, Agent, or Firm* — Chernoff Vilhauer McClung & Stenzel, LLP

(57) ABSTRACT

A cage allows fish to be moved under water in a river from a hatchery to a location at or near the river's mouth. The cage side walls contain openings which allow water to pass through the cage as it is towed downstream but prevent the fish from swimming out of the cage. A first flotation device supports the cage submerged where it is filled with fish and then towed downstream to where the fish are released. A second flotation device has passageways which allow filling it with either air or water. When filled with water it has no buoyancy effect on the cage. However, when filled with air the second flotation device raises the cage to where its bottom is at or near the water surface and it can be towed upstream with reduced drag.

2 Claims, 6 Drawing Sheets

METHOD AND APPARATUS FOR TRANSPORTING MIGRATORY FISH

BACKGROUND OF THE INVENTION

This invention relates to a cage for transporting fish fingerlings under water from an upstream hatchery down a river to a release point near the ocean without removing the fish from the water, and to a method of using such a cage.

Transporting ocean cycle fish fingerlings from an inland hatchery to the ocean is currently accomplished in two ways. One way is to pump the fish into a river and allow them to follow the river's current downstream. However, predators, such as birds, larger fish and seal lions, gather around where the fish are pumped into the river. The fish become disoriented by the pumping process and a high percentage of them are immediately lost to these predators. In addition, when the remaining fish reach dams they pass through the turbines which kills even more. The second method is to pump the fish into a tank truck and drive them to a release point and then pump them out of the tank truck into the river. However, the fish again are disoriented when pumped back into the river and are easy prey for the natural predators. This is aggravated by the fact that hatchery fish are fed from above in the hatchery and when pumped out of the tank truck the fish swim to the surface looking for food.

BRIEF SUMMARY OF THE INVENTION

A cage for transporting fish in the water has side walls having openings which allow water to pass freely through the cage but prevent fish from swimming out of the cage. A first flotation device attached to the cage is filled with air and supports the cage in a submerged orientation with its top at or around the surface of the water. A second flotation device has passageways that allow it to be filled with either air or water. When it is filled with water the second flotation device has no buoyancy affect on the cage. However, when it is filled with air it works in combination with the first flotation device to cause the cage to float to a raised orientation with its bottom at or near the surface of the water.

The cage is filled with fish from a hatchery when in its submerged orientation in a river. The submerged cage, and fish, are then towed downstream in the river to a location at or near where the river empties into the ocean. Doors in the side walls of the cage are then opened to allow the fish to swim out of the cage. The cage is then raised to its raised orientation and towed back upstream to repeat the process.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
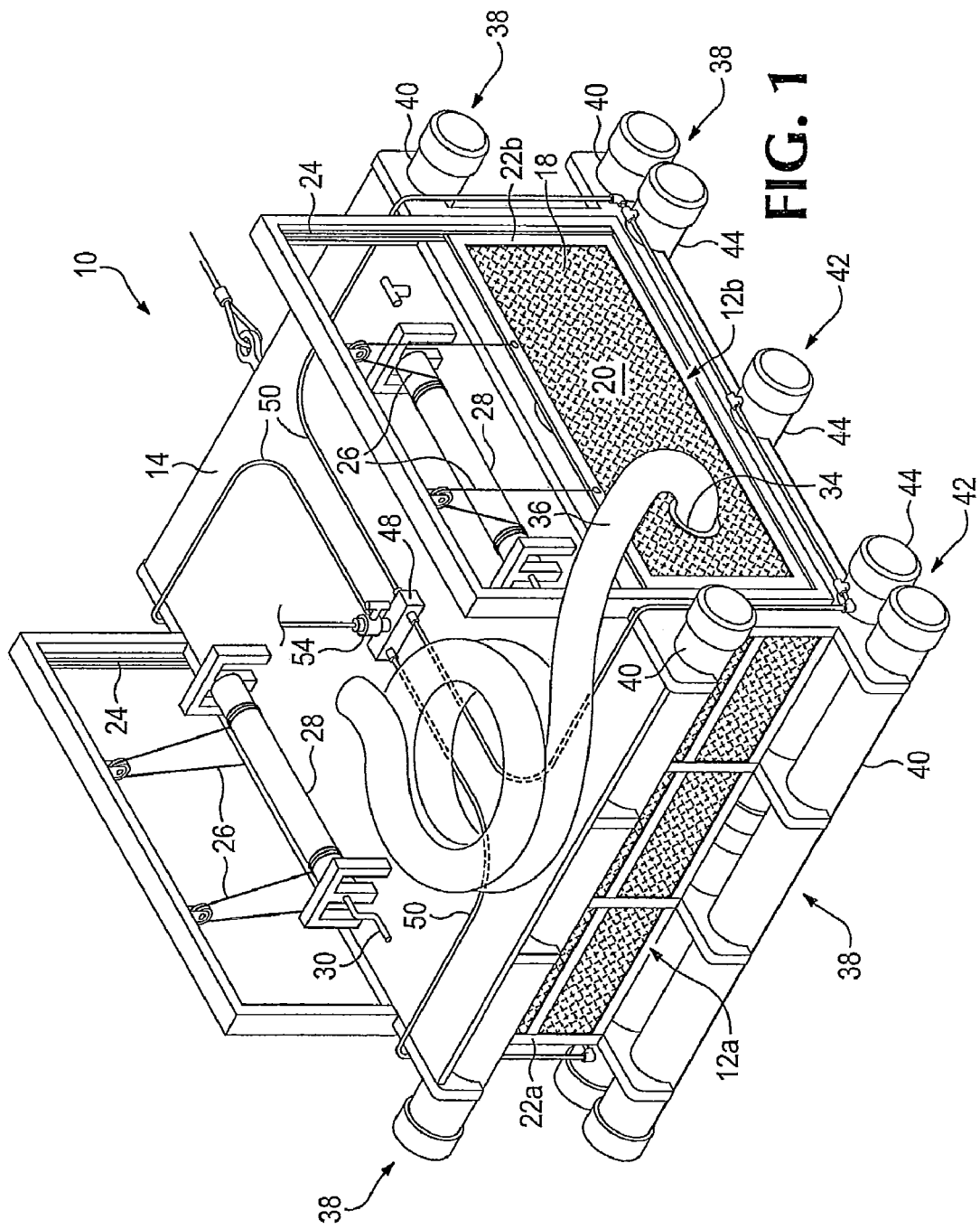
FIG. 1 is a perspective view showing a cage for transporting fish which embodies the subject invention.
Figure 2:
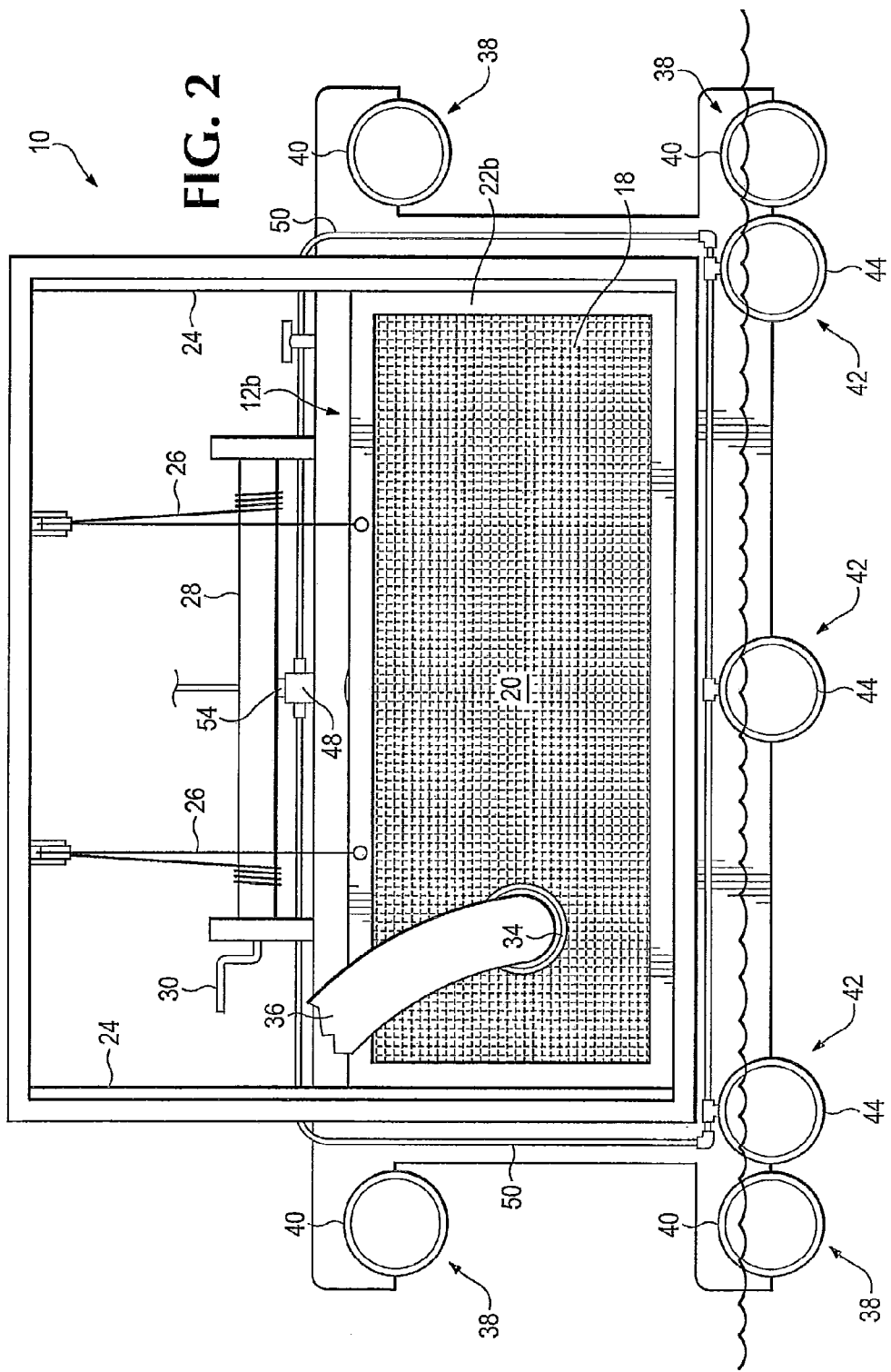
FIG. 2 is a first side elevational view of the cage.
Figure 3:
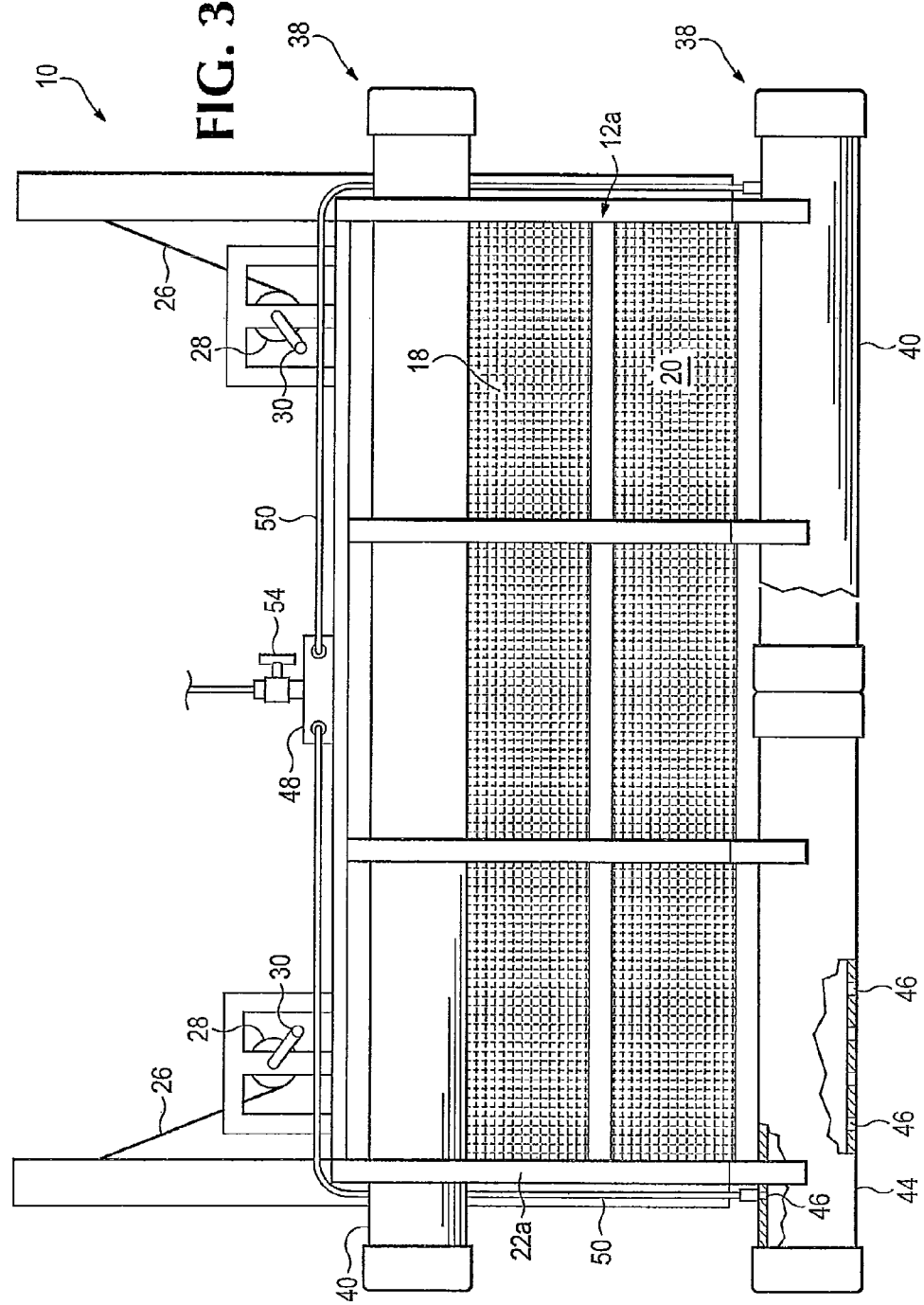
FIG. 3 is a second side elevational view of the cage.
Figure 4:
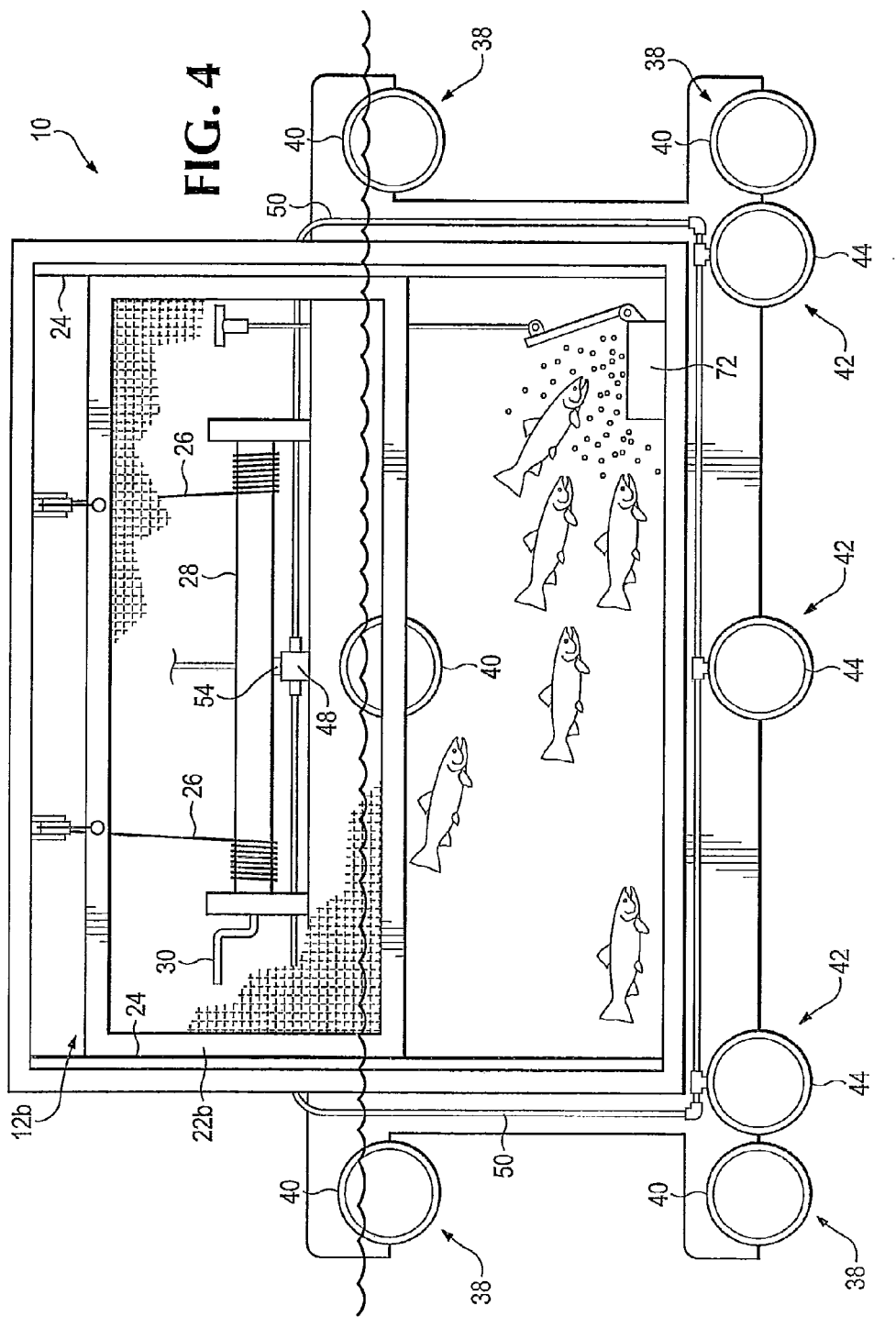
FIG. 4 is a first side elevational view, similar to FIG. 2, with the cage door open.
Figure 5:
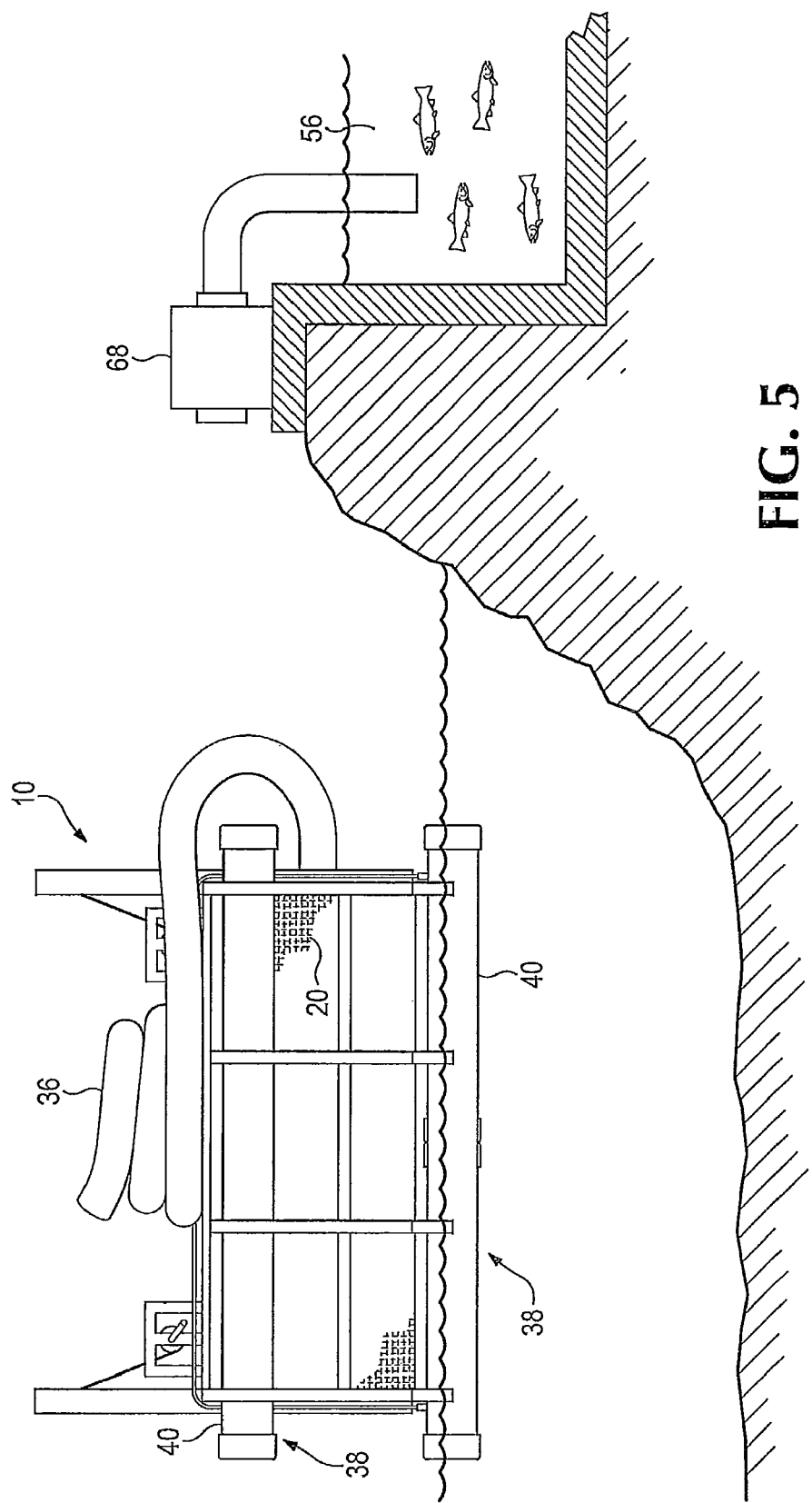
FIG. 5 is a side elevational view showing the cage located in a river adjacent to a fish hatchery.

Referring now to the drawings, a cage 10 is enclosed by side walls 12. In the embodiment shown in the drawings the cage is rectangular in cross-section and has four sidewalls arranged in opposed pairs. A top 14 and bottom 16 are attached to the side walls to form an enclosed cube. At least some of the side walls have a plurality of openings 18 extending through them. The size and spacing of the openings is such that water can pass freely through the cage and yet small fish fingerlings located in the cage cannot swim out of it through the openings. In the embodiment shown in the drawings the top 14 and bottom 16 are solid panels but could have openings as well. The side walls are shown as being constructed from screens 20 which are attached to tubular metal frames 22. A set of opposed first side walls 12a has first frames 22a which are immovably attached to the top 14 and bottom 16 to form a ridged cube. A set of opposed second side walls 12b has second frames 22b in the form of a rectangle which slide in tracks 24 between a closed position, FIGS. 1 and 2, where the second side walls enclose the cage and an open position, FIG. 4, where the second sidewalls are raised and fish can swim out of the cage. In the embodiment illustrated a cable attached to each second side wall 22b wraps around a drum 28 which can be rotated by a crank 30. A ratchet 32 (not shown) holds the side walls in their raised position and can be released to lower the side walls. Openings 34 located in at least some of the side walls are attached to hoses 36 through which fish can be pumped from hatchery ponds or holding tanks into the cage. The hoses can be coiled and placed on top of the cage when not being used, thereby effectively sealing the openings 34.

Figure 6:
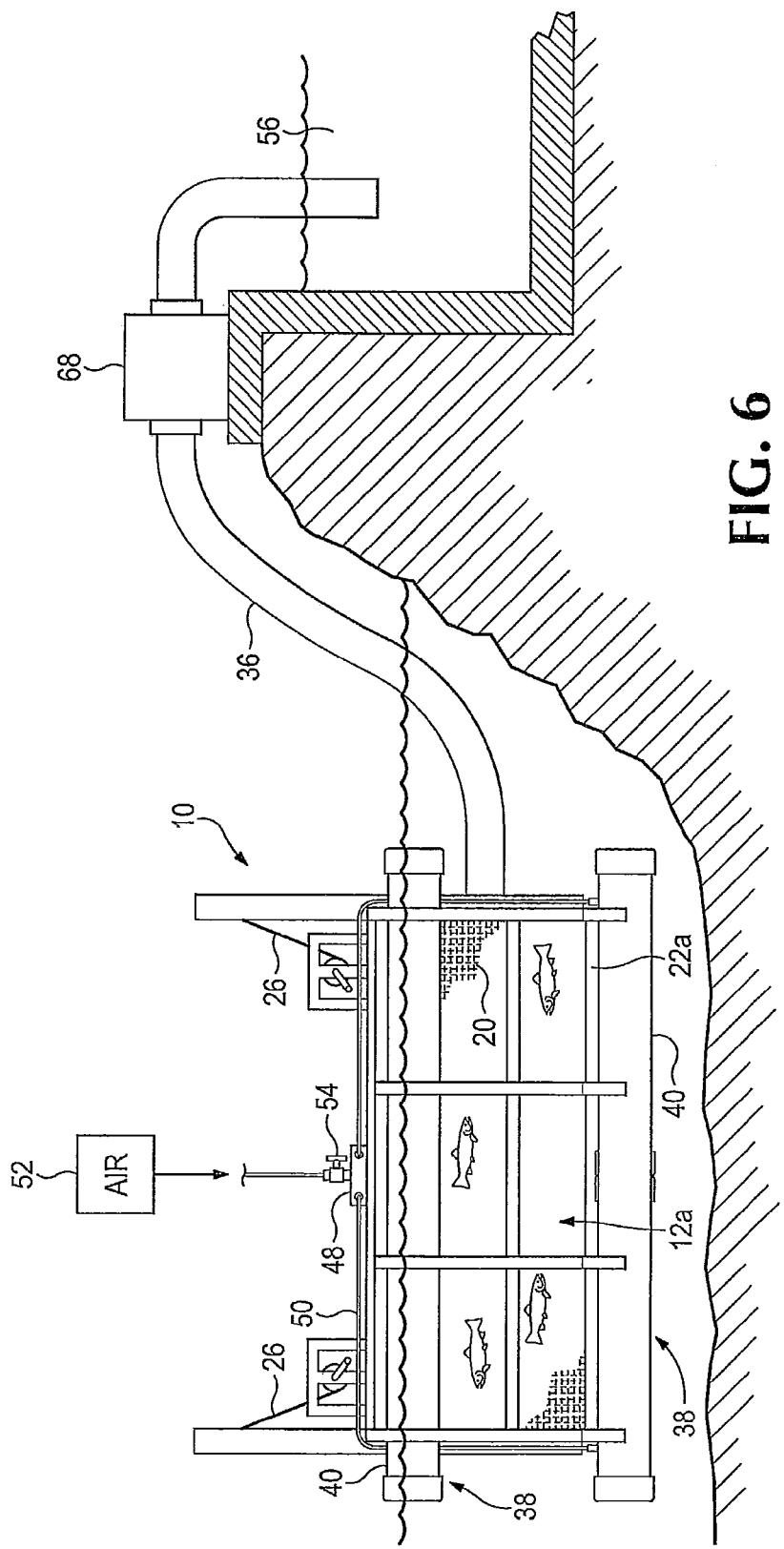
FIG. 6 is a side elevational view similar to FIG. 5 with the cage being filled with fish.

Attached to the cage is a first flotation device 38. In the embodiment shown in the drawings the first flotation device is a pair of elongate cylindrical first tubes 40 which are attached to the top 14, and a pair of first tubes 40 which are attached to the first frames 22a at or near the bottom 16. Alternatively the first tubes 40 could be attached only to the top 14. The first tubes 40 extend across the first side walls 12a. The first tubes are sealed and contain air. The size of the first tubes are such that when the cage is placed in the water the cage is submerged to where its top 14 floats near the surface of the water, FIG. 4. Attached to the cage, around the bottom 16, is a second flotation device 42. In the embodiment shown in the drawings the second flotation device is a plurality of elongate cylindrical closed end second tubes 44 similar to the first tubes 40. However, the second tubes 44 are not sealed like the first tubes 40. Instead, passageways, such as holes 46, are located at the bottoms and tops of the second tubes. Thus, when the cage is submerged water will fill the second tubes and they will have no buoyancy effect. A manifold 48 is placed on top of the cage and air lines 50 extend between the manifold and the holes 46 located at the tops of the second tubes 44. When a source of pressurized air 52, FIG. 6, is introduced into the second tubes through the air lines 50 the water is forced out of the second tubes through the holes 46 located at the bottoms of the tubes. When the second tubes 44 are filled with air they add additional buoyancy to the cage. The second tubes are sized such that when filled with air the cage is raised to where its bottom is at or near the surface of the water, FIG. 2. A valve 54 located at the manifold allows the manifold to be vented to the atmosphere or connected to the source of pressurized air. In the embodiment shown in the drawings, there are three rows of second tubes 44 with two tubes in each row, providing six individual second tubes. As a result of the second tubes being spaced around the entire foot print of the cage air does not go to one side of a tube and unbalance the cage when the cage is rocked while the second tubes are being filled.

Located at the bottom 16 of the cage is a food dispenser 72 which allows food for feeding the fish to be dispensed into the cage. This trains the fish to look down for food rather than looking at the surface of the water.

In operation the cage 10, with the second side walls 12b closed, is placed in a river near a fish hatchery pool 56 or holding tank and lowered to its submerged orientation, FIG. 6, by opening the valve 54 and allowing water to fill the second tubes 44. The hoses 36 are then connected to a fish pump 58 and fish fingerlings are pumped from the pool 56 into the cage. When the cage is full of fish fingerlings the hoses 36 are disconnected from the pump and placed on top of the cage. A boat, not shown, is then connected to the cage and the cage is pulled slowly down river. Preferably, the cage is pulled at a speed such that it moves only slightly faster than the river current. This allows the boat to maintain control of the cage but water does not move through the cage so fast as to push the fish against the back side wall 12. This prevents the fish from being disturbed by the journey which can take several days depending on the distance between the hatchery and the discharge point. During this trip food is dispensed from the feeders 72 at the bottom of the cage. If there is a mid-river dam on the route the cage and boat bypasses the dam through locks.

When the cage reaches the ocean, or a bay or estuary that opens into the ocean, towing is discontinued and the second side walls 12 are raised by releasing the ratchets and turning the drums 28 with the cranks 30. This allows the fish to swim out of the cage at their own pace which, along with their newly learned habit to look down for food, allows the fish to leave the cage without being placed where a large percentage of them can be eaten by birds, fish or sea lions.

After all the fish have left the cage the second side walls 12b are lowered. The source of pressurized air is connected to the second tubes 44 thereby filling the second tubes with air and raising the cage to its raised position. This allows the cage to be towed back upstream at a much higher speed because of a lower drag due to the cage floating at the surface of the river. The cage is then towed to the same or another fish hatchery and the process is repeated.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method of transporting fish comprising:
a) providing a cage having sidewalls which include a plurality of openings which are large enough to allow water to pass through said cage but not large enough to allow fish to swim out of such cage;
b) providing a first floatation device which is attached to said cage and supports said cage in water in a submerged orientation;
c) providing a second floatation device which is attached to said cage and contains openings which cause said second floatation device to normally be filled with water;
d) providing an air distribution system which allows said second floatation device to be filled with air and support said cage in a raised position on the water's surface;
e) placing said cage in a submerged orientation in a river near a fish hatchery;
f) filling said cage with fish from said hatchery;
g) towing such cage downstream in the river in a submerged orientation to a location near where the river flows into the ocean; and
h) opening said cage to allow fish to swim out of said cage.

2. The method of claim 1 including the step of:
a) introducing pressurized air into said second floatation device through said air distribution system to raise said cage to said raised orientation; and
b) towing said cage upstream in said raised orientation to a location where it can be filled with fish.

* * * * *